United States Patent
Dwyer et al.

(10) Patent No.: US 6,922,631 B1
(45) Date of Patent: Jul. 26, 2005

(54) SYSTEM AND METHOD FOR TEXTUALLY DISPLAYING AN ORIGINAL FLIGHT PLAN AND A MODIFIED FLIGHT PLAN SIMULTANEOUSLY

(75) Inventors: David B. Dwyer, Scottsdale, AZ (US); Jan G. Hart, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/680,280

(22) Filed: Oct. 6, 2000

(51) Int. Cl.[7] ............ G01C 21/00; G05D 1/08; G09G 5/08
(52) U.S. Cl. ............ 701/206; 701/210; 340/971
(58) Field of Search ............ 701/202, 206, 701/3, 14, 120, 122, 201, 210, 200; 73/178 R; 342/451; 340/971, 973, 979

(56) References Cited

U.S. PATENT DOCUMENTS

| | | | | |
|---|---|---|---|---|
| 3,267,263 A | | 8/1966 | Nelson et al. | 235/150.27 |
| 3,652,837 A | | 3/1972 | Perkins | 235/150.27 |
| 3,883,861 A | | 5/1975 | Heartz | 340/324 R |
| 4,086,632 A | * | 4/1978 | Lions | 364/444 |
| 4,339,751 A | | 7/1982 | Pease | 343/5 DP |
| 4,413,322 A | | 11/1983 | Foster et al. | 364/448 |
| 4,642,775 A | * | 2/1987 | Cline et al. | 364/443 |
| 4,692,869 A | | 9/1987 | King et al. | 364/448 |
| 4,796,190 A | | 1/1989 | Cummings | 364/449 |
| 4,812,990 A | | 3/1989 | Adams et al. | 364/444 |
| 4,825,374 A | | 4/1989 | King et al. | 364/433 |
| 4,827,419 A | | 5/1989 | Selby, III | 364/443 |
| 4,857,902 A | | 8/1989 | Naimark et al. | 340/709 |
| 4,888,699 A | | 12/1989 | Knoll et al. | 364/449 |
| 4,891,761 A | | 1/1990 | Gray et al. | 364/452 |
| 4,893,127 A | | 1/1990 | Clark et al. | 342/386 |
| 4,937,752 A | | 6/1990 | Nanba et al. | 364/449 |
| 4,939,661 A | | 7/1990 | Barker et al. | 364/443 |
| 4,994,974 A | | 2/1991 | Cummings | 364/443 |
| 4,999,782 A | | 3/1991 | BeVan | 364/448 |
| 5,047,946 A | | 9/1991 | King et al. | 364/448 |
| 5,057,835 A | | 10/1991 | Factor et al. | 340/995 |
| 5,072,218 A | | 12/1991 | Spero et al. | 340/980 |

(Continued)

FOREIGN PATENT DOCUMENTS

| | | |
|---|---|---|
| EP | 0388174 | 9/1990 |
| EP | 0516501 | 12/1992 |
| EP | 0826946 A1 | 3/1996 |
| EP | 0 826 946 | 3/1998 |

*Primary Examiner*—Thomas G. Black
*Assistant Examiner*—Dalena Tran

(57) ABSTRACT

A navigational system includes a display device and logic that simultaneously presents a textual display of an original flight plan and a modified flight plan on the display device. The textual display includes a textlist of waypoints that are on the original flight plan and the modified flight plan and performance data for common waypoints that are on both the original flight plan and the modified flight plan, as well as for new waypoints that are added to the modified flight plan. The performance data for each common waypoint includes performance data for the waypoint on the original flight plan and for the waypoint on the modified flight plan. The system may further include an interface device that allows an operator to change the modified flight plan. The logic updates the textlist of waypoints on the textual display when the modified flight plan is changed and updates the performance data on the textual display for common waypoints when the modified flight plan is changed. The logic may also designate on the textual display waypoints to be removed, which correspond to waypoints that are on the original flight plan but not on the modified flight plan, and, when the modified flight plan is activated to become a new flight plan, the logic removes from the textual display the waypoints that are designated to be removed.

51 Claims, 12 Drawing Sheets

U.S. PATENT DOCUMENTS

| | | | |
|---|---|---|---|
| 5,179,385 A | 1/1993 | O'Loughlin et al. | 342/176 |
| 5,220,507 A | 6/1993 | Kirson | 364/444 |
| 5,268,844 A | 12/1993 | Carver et al. | 364/443 |
| 5,340,061 A * | 8/1994 | Vaquier et al. | 244/175 |
| 5,408,413 A * | 4/1995 | Gonser et al. | 364/446 |
| 5,422,814 A | 6/1995 | Sprague et al. | 364/449 |
| 5,463,554 A | 10/1995 | Araki et al. | 364/444 |
| 5,519,392 A | 5/1996 | Oder et al. | 340/995 |
| 5,646,854 A | 7/1997 | Bevan | 364/448 |
| 5,715,163 A * | 2/1998 | Bang et al. | 364/444.2 |
| 5,774,818 A | 6/1998 | Pages | 701/3 |
| 5,797,106 A * | 8/1998 | Murray et al. | 701/11 |
| 5,842,142 A * | 11/1998 | Murray et al. | 701/16 |
| 5,916,297 A * | 6/1999 | Griffin, III et al. | 701/120 |
| 5,995,901 A | 11/1999 | Owen et al. | 701/202 |
| 6,038,508 A | 3/2000 | Maekawa et al. | 701/207 |
| 6,112,141 A * | 8/2000 | Briffe et al. | 701/14 |
| 6,134,500 A * | 10/2000 | Tang et al. | 701/202 |
| 6,163,744 A * | 12/2000 | Onken et al. | 701/3 |
| 6,181,987 B1 * | 1/2001 | Deker et al. | 701/3 |
| 6,314,349 B1 | 11/2001 | Tomasi et al. | 701/23 |
| 6,314,362 B1 | 11/2001 | Erzberger et al. | 701/120 |
| 6,321,158 B1 | 11/2001 | DeLorme et al. | 701/201 |

* cited by examiner

| Textlist |
|---|
| LL07 |
| INW |
| GCN |
| PGS |
| BLD |
| KLAS |
| ABC |
| BTY |
| BIH |
| FRA |
| HYP |
| MOD |
| KSFO |

| Modified | ModifiedIndex | CopyID? |
|---|---|---|
| LL07 | 0 | yes |
| INW | 1 | yes |
| KLAS | 2 | yes |
| ABC | 3 | no |
| BTY | 4 | yes |
| BIH | 5 | yes |
| FRA | 6 | yes |
| HYP | 7 | yes |

| Original | Original Index |
|---|---|
| LL07 | 0 |
| INW | 1 |
| GCN | 2 |
| PGS | 3 |
| BLD | 4 |
| KLAS | 5 |
| BTY | 6 |
| BIH | 7 |
| FRA | 8 |
| HYP | 9 |
| MOD | 10 |
| KSFO | 11 |

Figure 12

SYSTEM AND METHOD FOR TEXTUALLY DISPLAYING AN ORIGINAL FLIGHT PLAN AND A MODIFIED FLIGHT PLAN SIMULTANEOUSLY

BACKGROUND OF THE INVENTION

1. Field of the Invention

The present invention relates to aircraft navigation. More particularly, the present invention relates to an improved aircraft navigation system and method for textually displaying an original flight plan and a modified flight plan simultaneously.

2. Description of the Related Art

Conventional flight planning systems provide a graphical representation of an active flight plan on a graphical display and a textual representation of the active flight plan on a separate Control Display Unit (CDU). The flight plan displayed on the CDU includes route information listing the waypoints and showing performance data, such as constraints and performance parameters, for each. The constraints include descent angle, speed, altitude, time, etc., and the performance parameters include course and distance information, expected time of arrival, fuel remaining, winds aloft, groundspeed, etc. The graphical display shows the active flight plan in two dimensions with the waypoints connected by a line showing the active flight route. For example, FIG. 1 shows a graphical display with the waypoints ABC, LL01, and LL03 connected by the active flight route 202.

The active flight plan can be modified by adding or deleting waypoints by interfacing with the CDU using a keyboard or by interfacing with the graphical display using a cursor control device. The graphical display is capable of showing the active flight plan and the modified flight plan in graphical form. For example, FIG. 2 shows a graphical display with an active flight plan 202 including the waypoints GUP, GUP44, and ABC and a modified flight plan 204 direct from the aircraft's present position (PPOS) to ABC. A solid line represents the active flight plan, and a dashed line represents the modified flight plan.

However, once modifications are made to the active flight plan, either textually or graphically, conventional systems and methods display only a modified flight plan on the CDU, and a comparison of the constraints and performance parameters for the active and modified flight plans is not possible. When only the modified flight plan is displayed, the performance data for the active flight plan is no longer available or even easily discernable.

For example, U.S. Pat. No. 5,715,163 relates to a cursor controlled navigation system for aircraft in which a flight plan can be modified by adding waypoints to either a graphical display or a CDU. However, when the desired (i.e., modified) flight plan returns to the original flight plan, waypoints that are not on the desired flight plan are deleted. With this system, it is not possible to provide a simultaneous display of the original and modified flight plans. A comparison of the constraints and performance parameters of both the modified and original flight plans therefore cannot be done.

There is a need, therefore, for an improved navigation system that simultaneously, textually presents the original and modified flight plans, including constraints and performance parameters, on a single display. Improvements for inputting modified flight plans are also desirable.

SUMMARY OF THE INVENTION

It is a general object of the present invention to provide an improved navigational flight planning system.

It is another object of the present invention to provide a system and method for simultaneously, textually displaying the original and modified flight plans of a navigational system, allowing comparison of the performance data of each flight plan.

In accordance with the objects described above, one aspect of the present invention relates to a navigational system that includes a display device and logic that simultaneously presents a textual display of an original flight plan and a modified flight plan on the display device. The textual display may include a textlist of waypoints that are on the original flight plan and the modified flight plan, performance data for common waypoints that are on both the original flight plan and the modified flight plan, and performance data for waypoints that are added to the modified flight plan. The performance data for each common waypoint may include performance data for the waypoint on the original flight plan and for the waypoint on the modified flight plan. The system may further include an interface device that allows an operator to change the modified flight plan. The logic updates the textlist of waypoints on the textual display when the modified flight plan is changed and updates the performance data on the textual display for common waypoints when the modified flight plan is changed. The logic may also designate on the textual display waypoints to be removed, which correspond to waypoints that are on the original flight plan but not on the modified flight plan and, when the modified flight plan is activated to become the new original flight plan, the logic removes from the textual display the waypoints that are designated to be removed. The system may also include simultaneously presenting a graphical display of the original flight plan and the modified flight plan on the display device. The interface device allows an operator to change the modified flight plan on either the textual display or the graphical display, the graphical display of the modified flight plan is updated when the modified flight plan is changed and, when the modified flight plan is activated to become the new original flight plan, the graphical display is updated to display only the new original flight plan.

Another aspect of the present invention relates to a navigational system that includes display means and logic means for simultaneously, textually displaying an original flight plan and a modified flight plan on the display means. The textual display may include a textlist of waypoints that are on the original flight plan and the modified flight plan, performance data for common waypoints that are on both the original flight plan and the modified flight plan, and performance data for waypoints that are added to the modified flight plan. The performance data for each common waypoint may include performance data for the waypoint on the original flight plan and for the waypoint on the modified flight plan. The system may further include interface means that allows an operator to change the modified flight plan, where the logic means updates the textlist of waypoints on the textual display when the modified flight plan is modified and updates the performance data on the textual display for common waypoints when the modified flight plan is modified. The logic means may also designate on the textual display waypoints to be removed, which correspond to waypoints that are on the original flight plan but not on the modified flight plan and, when the modified flight plan is activated to become a new flight plan, the logic means removes from the textual display the waypoints that are designated to be removed.

Yet another aspect of the present invention relates to a method of displaying a flight plan of a navigational system that includes the steps of providing a display device and simultaneously displaying a textual display of an original flight plan and a modified flight plan on the display device. The textual display displayed in the displaying step may include a textlist of waypoints that are on the original flight plan and the modified flight plan, performance data for common waypoints that are on both the original flight plan and the modified flight plan, and performance data for waypoints that are added to the modified flight plan. The performance data for each common waypoint may include performance data for the waypoint on the original flight plan and for the waypoint on the modified flight plan. The method may further include the steps of changing the modified flight plan, updating the textlist of waypoints on the textual display when the modified flight plan is modified, updating the performance data on the textual display for common waypoints when the modified flight plan is modified, designating on the textual display waypoints to be removed, which correspond to waypoints that are on the original flight plan but not on the modified flight plan, activating the modified flight plan to become a new flight plan, and removing from the textual display the waypoints that are designated to be removed in the designating step. The displaying step may further include simultaneously displaying a graphical display of the original flight plan and the modified flight plan on the display device, where the changing step includes changing the modified flight plan in either the graphical display or the textual display, and the method further includes the steps of updating the graphical display of the modified flight plan when the modified flight plan is modified and updating the graphical display to display only the new flight plan when the modified flight plan is activated in the activating step.

Still another aspect of the present invention relates to computer executable code for implementing a method of displaying a flight plan of a navigational system, where the code is for executing the step including simultaneously displaying a textual display of an original flight plan and a modified flight plan on a display device. The textual display displayed in the displaying step may include a textlist of waypoints that are on the original flight plan and the modified flight plan, performance data for common waypoints that are on both the original flight plan and the modified flight plan, and performance data for waypoints that are added to the modified flight plan. The performance data presented for each common waypoint may include performance data for the waypoint on the original flight plan and for the waypoint on the modified flight plan. The code may also be for further executing the steps including changing the modified flight plan, updating the textlist of waypoints on the textual display when the modified flight plan is modified, updating the performance data on the textual display for common waypoints when the modified flight plan is modified, designating on the textual display waypoints to be removed corresponding to waypoints that are on the original flight plan but not on the modified flight plan, activating the modified flight plan to become a new flight plan, and removing from the textual display the waypoints that are designated to be removed in the designating step. The displaying step may further include simultaneously displaying a graphical display of the original flight plan and the modified flight plan on the display device, where the changing step includes changing the modified flight plan in either the graphical display or the textual display, and the code is for further executing the steps of updating the graphical display of the modified flight plan when the modified flight plan is modified and updating the graphical display to display only the new flight plan when the modified flight plan is activated in the activating step.

Still another aspect of the present invention relates to a navigational system that includes a CPU, a flight control system that controls an aircraft based on inputs from the CPU, a display device, and logic that simultaneously presents a textual display of an original flight plan and a modified flight plan on the display device. The CPU provides inputs to the flight control system based on navigational data corresponding to the original flight plan that is presented on the display device.

Another aspect of the present invention relates to a navigational system that includes a display device and logic that simultaneously presents a textual display of comparative data for an original flight plan and a modified flight plan on the display device. The comparative data may include a textlist of waypoints that are on the original flight plan and the modified flight plan, performance data for common waypoints that are on both the original flight plan and the modified flight plan, and performance data for waypoints that are added to the modified flight plan. The performance data for each common waypoint may include performance data for the waypoint on the original flight plan and for the waypoint on the modified flight plan. The system may further include an interface device that allows an operator to change the modified flight plan, where the logic updates the comparative data on the textual display when the modified flight plan is modified. The logic may also designate on the textual display waypoints to be removed, which correspond to waypoints that are on the original flight plan but not on the modified flight plan and, when the modified flight plan is activated to become a new flight plan, the logic may remove from the textual display the waypoints that are designated to be removed. The system may further include simultaneously presenting on the display device a graphical display of the original flight plan and the modified flight plan, where the interface device allows an operator to change the modified flight plan on either the textual display or the graphical display. The graphical display of the modified flight plan is then updated when the modified flight plan is changed and, when the modified flight plan is activated to become a new flight plan, the graphical display is updated to display only the new flight plan.

These and other aspects, objects, and features of the present invention will become apparent from the following detailed description of the preferred embodiments, read in conjunction with, and reference to, the accompanying drawings.

BRIEF DESCRIPTION OF THE DRAWINGS

FIG. 12 shows an original flight plan and a modified flight plan, and a textlist built from the flight plans.

DETAILED DESCRIPTION OF THE PREFERRED EMBODIMENT

The present invention solves the problems of the conventional systems by displaying a textlist that simultaneously presents both an original flight plan and a modified flight plan. Performance data, such as constraints and performance parameters, for both flight plans may then be compared prior to activating the modified flight plan.

Figure 1:
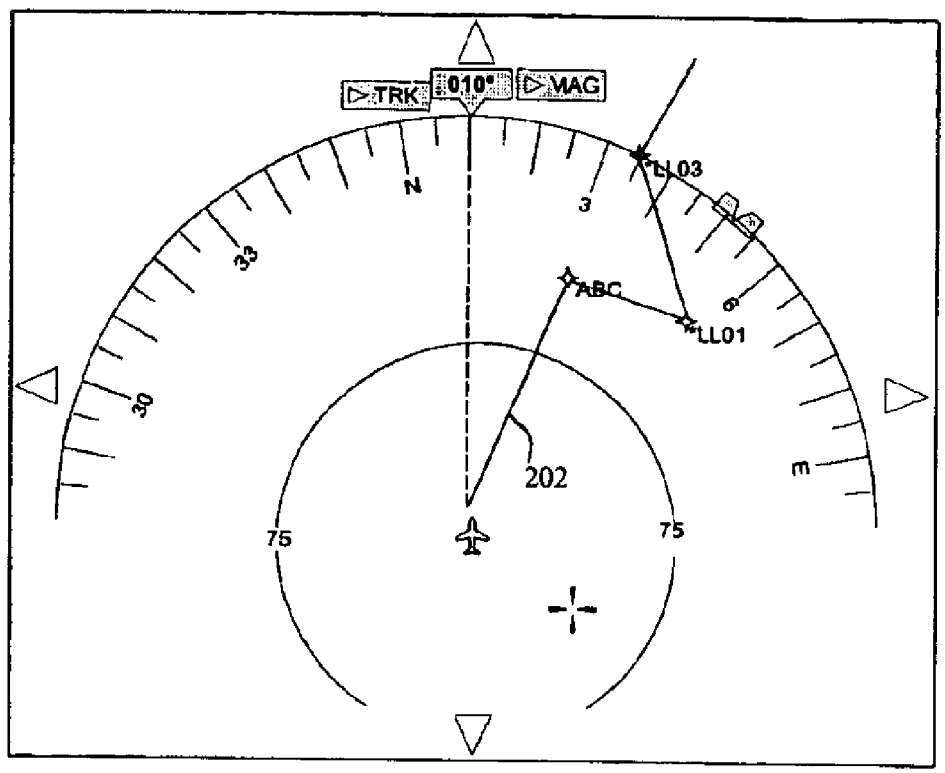
FIG. 1 is a graphical display of an original flight plan.
Figure 2:
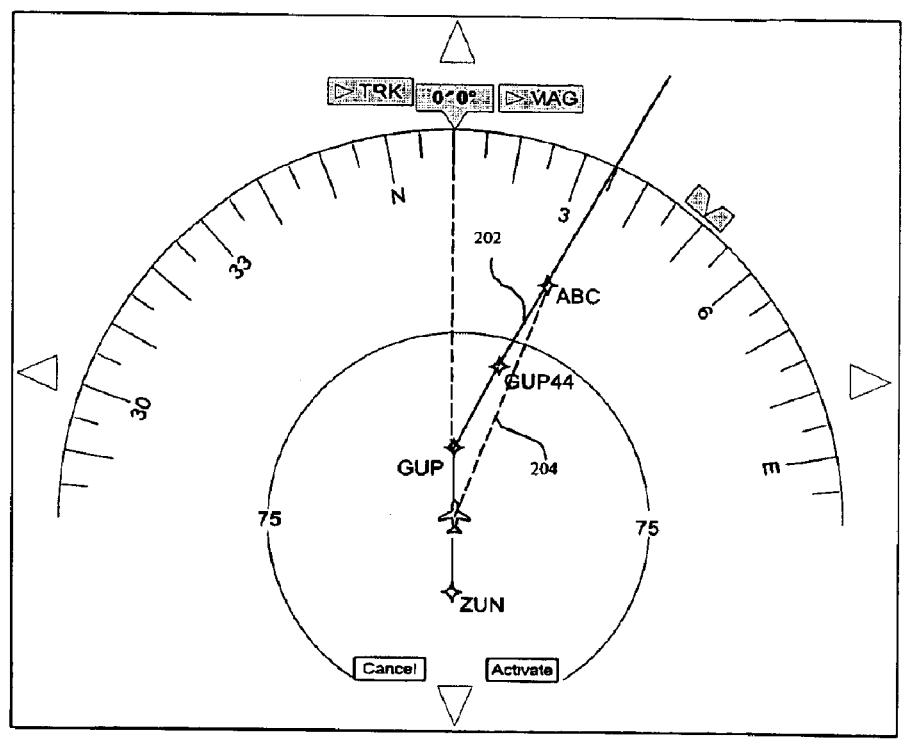
FIG. 2 is a graphical display showing a modified flight plan and an original flight plan.
Figure 3:
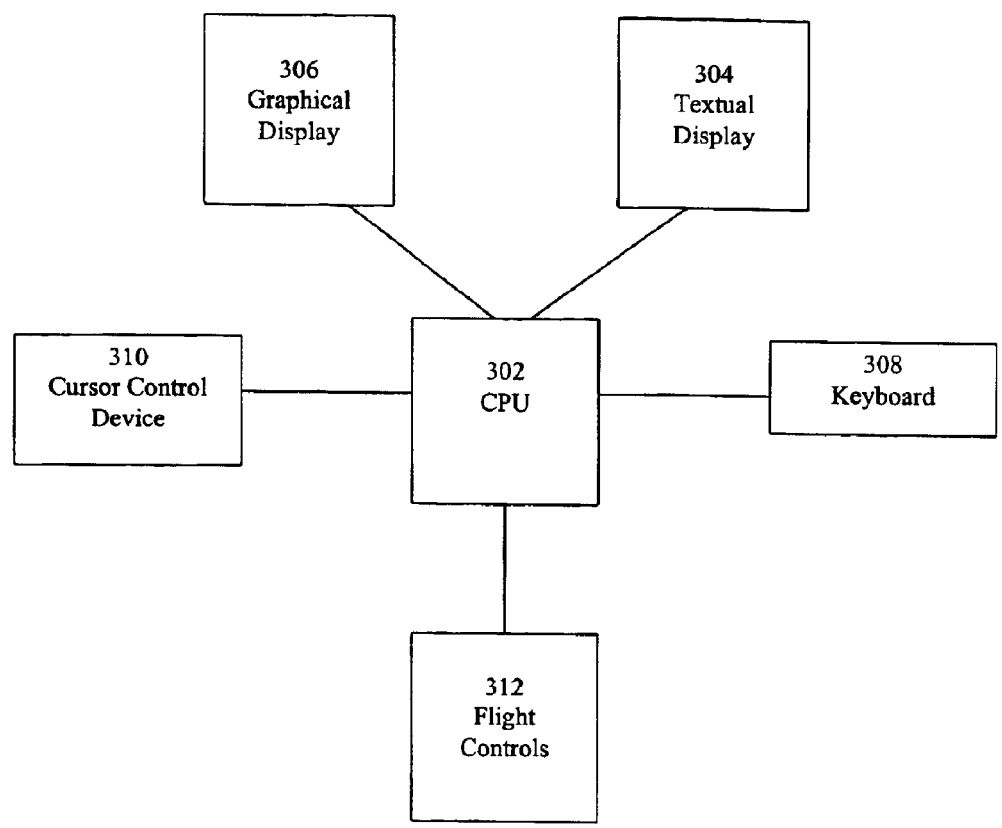
FIG. 3 is a block diagram showing typical components of a navigational system.

Each of the elements shown in block outline in FIG. 3 is well known, per se, and a specific type of construction of each is not critical to carrying out the invention or to a disclosure of the best mode for carrying out the invention.

FIG. 3 is a block diagram showing components of a navigational system for use with the present invention. The system includes a CPU 302 that interfaces with the navigational system and other systems on the aircraft. The CPU 302 may be a flight management computer or an area navigator. The CPU 302 includes logic for the navigational system for textually and/or graphically displaying flight plans on a textual display 304 and a graphical display 306, respectively. Interface devices, such as a keyboard 308 and a cursor control device 310, allow a user to interface with the CPU 302 to operate the navigational system. The CPU 302 may also operate the flight control system 312 based on inputs from the logic of the navigational system. Alternatively, the outputs from the CPU 302 can be sent to a display that shows the lateral and vertical deviations from the desired lateral and vertical path. The pilot can then hand fly the aircraft following the deviations, without an autopilot or flight director. Yet another implementation is to send outputs from the CPU 302 to a flight director. The flight director then provides steering cues or commands for the pilot to follow. The steering cues or commands keep the aircraft on the CPU's defined lateral and vertical path.

The present invention does not require the use of a graphical display. The present invention applies to the simultaneous textual display of an original flight plan and a modified flight plan. However, it is preferred to provide the textual display 304 in conjunction with the graphical display 306, for example, a CDU and a graphical display. It is more preferred to combine the textual display 304 and the graphical display 306 on a single screen, for example, a computer monitor, to provide all relevant information in a single location.

Figure 4:
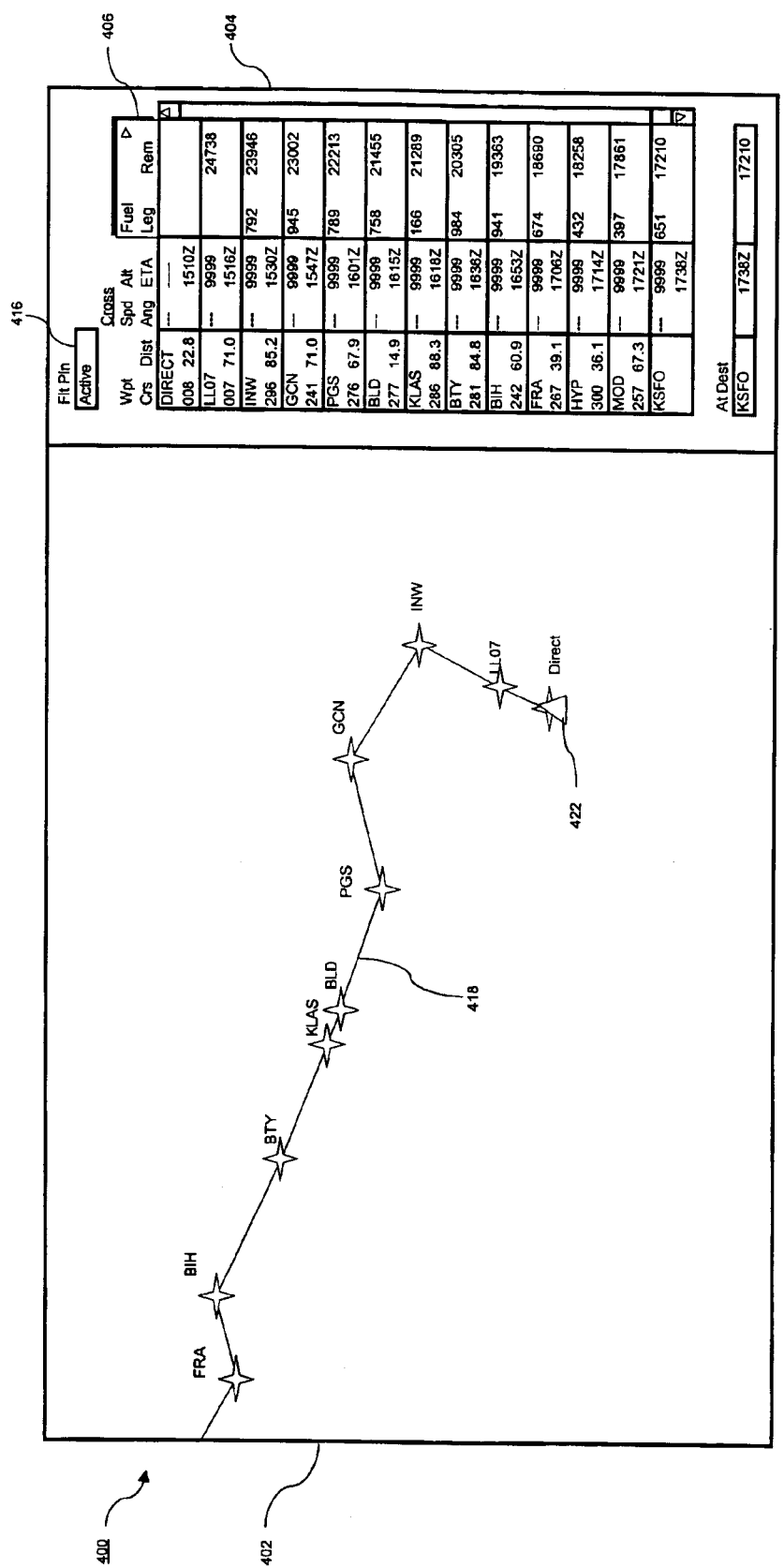
FIG. 4 is a combined graphical and textual display according to an embodiment of the present invention, showing an original flight plan.

Operation of an embodiment of the navigational system according to the present invention will now be described with reference to FIGS. 4–8, where like reference numbers represent the same features. FIG. 4 shows a graphical display 402 and a textual display 404 combined in a single navigational display 400, such as a computer generated display on a computer monitor. The graphical display 402 shows the original, or active, flight plan 418 as a solid line connecting the PPOS 422 of the aircraft to waypoints LL07, INW, GCN, PGS, BLD, KLAS, BTY, BIH, and FRA, and the aircraft is currently flying direct to waypoint LL07. The graphical display 402 shows only a portion of the flight plan; therefore, waypoints after FRA are not shown, as they are not located within the viewing area.

The textual display 404 lists the waypoints of the original flight plan, as well as corresponding constraints and performance parameters for each. The route type controller 416 indicates that the active flight plan is currently being displayed. The textual display 404 also shows that the aircraft is currently flying direct to waypoint LL07, as listed in the first two boxes of the textual display 404, and then to the remaining waypoints in the order listed.

The data listed for each waypoint shows the course and distance from that waypoint to the next. Initially, the course and distance from PPOS 422 to LL07 are 008° and 22.8 nautical miles, respectively. The data also shows that the Expected Time of Arrival (ETA) at LL07 is 1516Z, that the waypoint will be crossed at an altitude of 9999 (i.e., 10,000) feet, and the fuel remaining at LL07 is 24,738 pounds. As shown, for example from INW to GCN, the display also provides the amount of fuel required for each leg, which is 945 pounds in this example. The textual display 404 is also capable of displaying airspeed constraints/predictions (Spd) and vertical path descent angles (Ang) for crossing each waypoint.

The present invention is not limited to displaying only the constraints and performance parameters shown in FIG. 4, and additional information for the flight route may be displayed, for example, groundspeed and true airspeed, leg distance and distance to go (DTG) to destination, leg time and time remaining to destination, and predicted wind and temperature for each waypoint in the flight plan. The embodiment shown in FIG. 4 includes a button 406, which allows cycling between different sets of displayed information. For example, the current display shows the fuel for each leg and the fuel remaining at each waypoint, but if the button 406 is selected with a cursor, then other information may be displayed.

Figure 5:
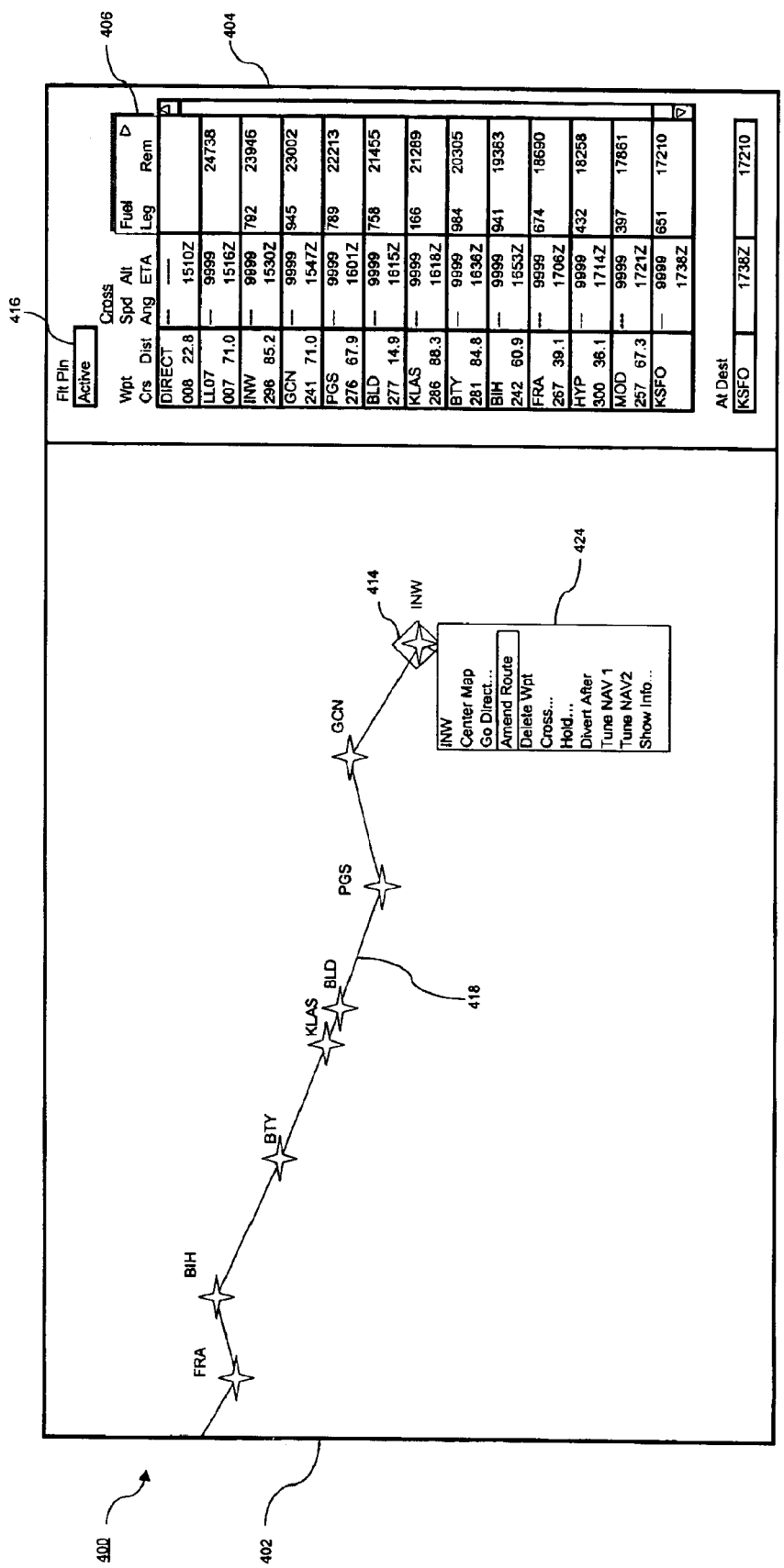
FIG. 5 is a combined graphical and textual display according to an embodiment of the present invention, showing options for changing the original flight plan.

The portion of the original flight plan of interest in FIG. 4 consists of flying from INW direct GCN direct PGS direct BLD direct KLAS and then as filed. It is desired to modify the original flight plan to fly direct from INW to KLAS, which will remove the waypoints GCN, PGS, and BLD from the original flight plan. To begin the modification process, waypoint INW is selected with the cursor 414, and the "Amend Route" task is selected from the task menu 424 (FIG. 5).

Figure 6:
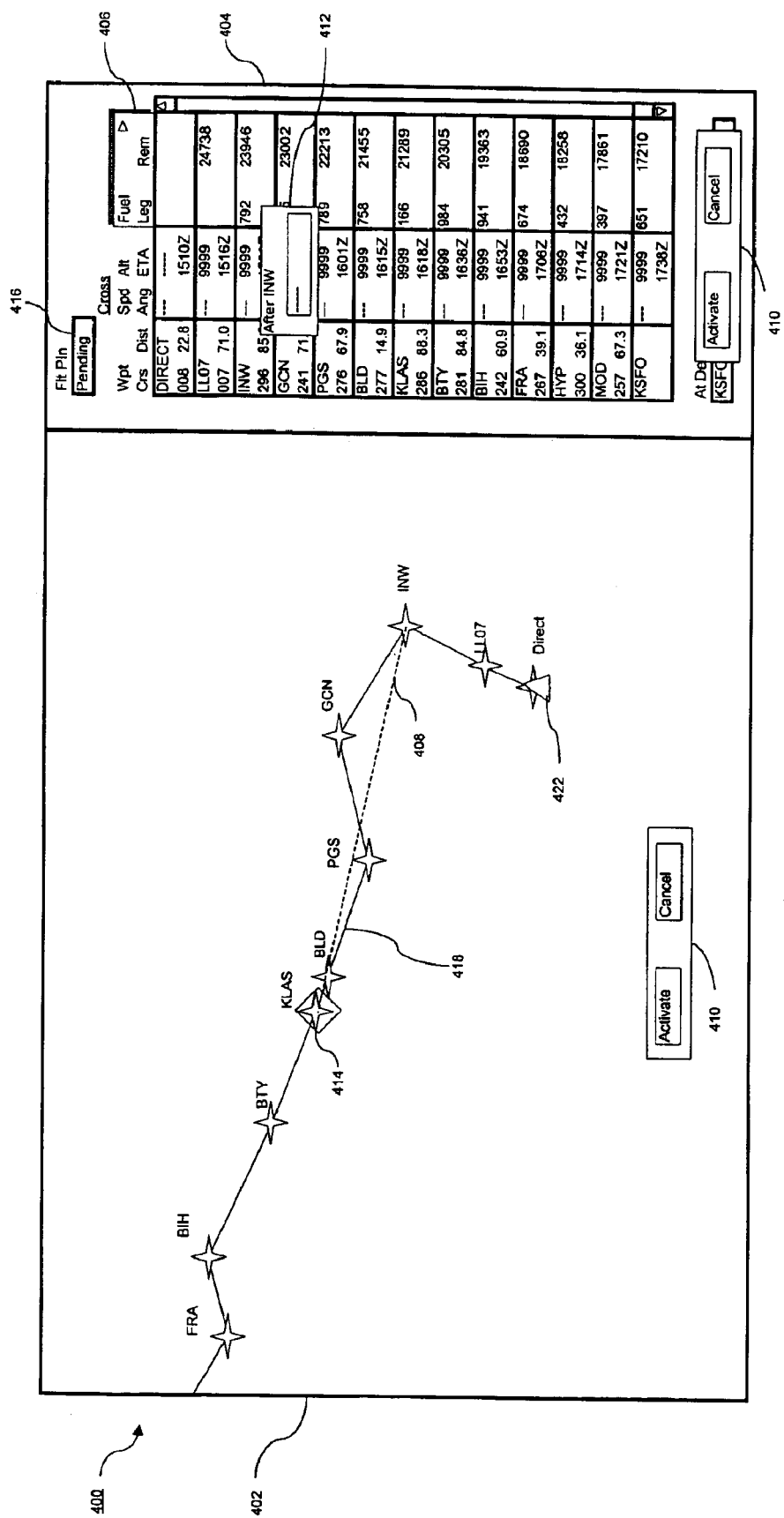
FIG. 6 is a combined graphical and textual display according to an embodiment of the present invention, showing initial modifications to the original flight plan.

Then, as shown in FIG. 6, the textual display 404 indicates "Pending" in the route type controller 416, indicating that modifications to the flight plan are in progress. At this time, the cursor 414 is used to designate the route modification, as shown by the dashed line 408 proceeding west from INW. The dashed line 408 represents movement of the cursor 414 from INW towards KLAS, and KLAS is selected with the cursor 414. Additionally, "Activate/Cancel" buttons 410 appear at the bottom of the graphical display 402 and the textual display 404. If Activate is selected with the cursor 414, then the route modification is accepted, and if Cancel is selected with the cursor 414, then the Amend Route process is canceled. Furthermore, the textual display 404 now contains a small dialog box 412, which allows the operator to type in the next waypoint, rather than pointing to it graphically with the cursor 414.

Figure 7:
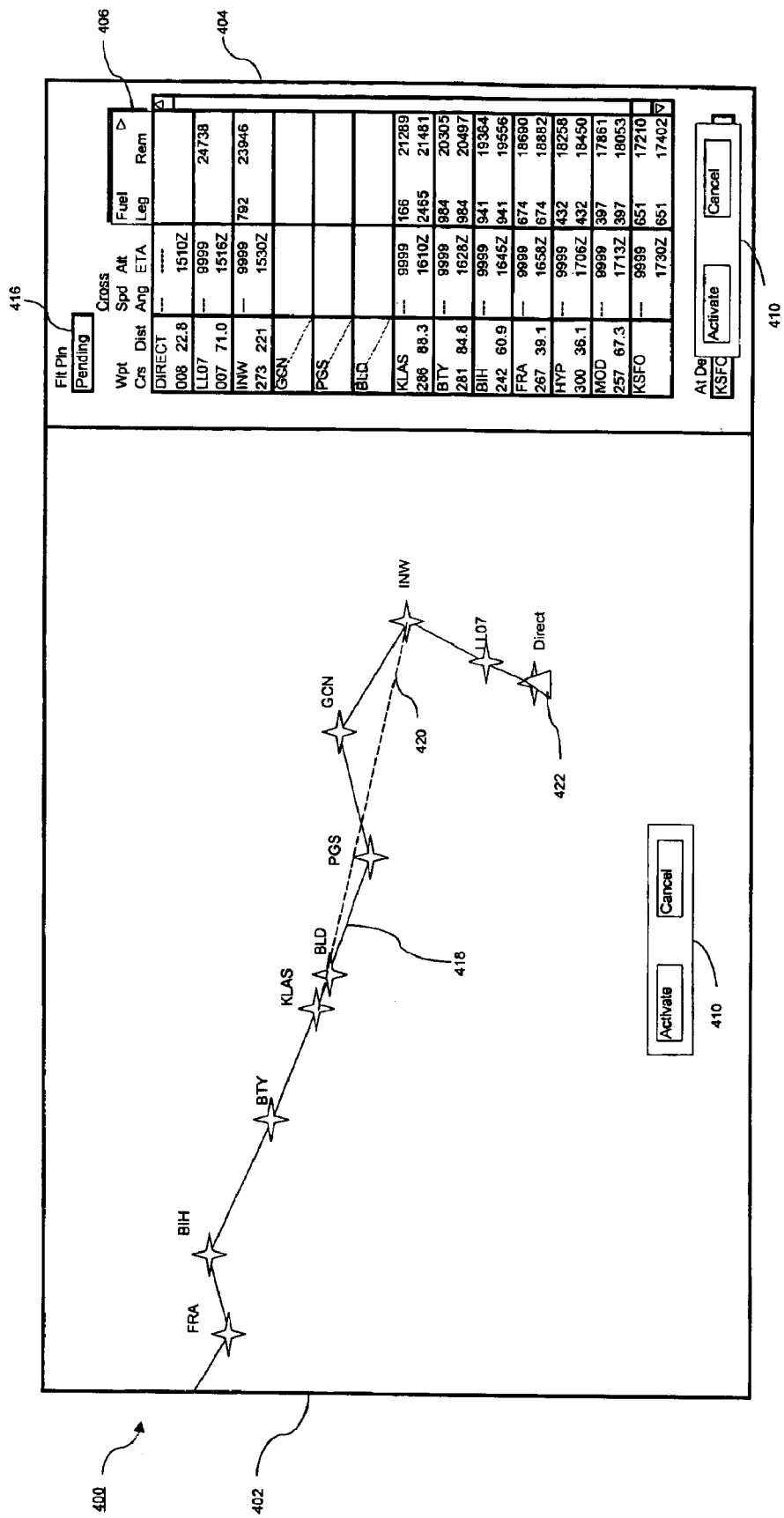
FIG. 7 is a combined graphical and textual display according to an embodiment of the present invention, showing the original and modified flight plans.

When KLAS is selected with the cursor 414, the graphical display 402 then shows both the original flight plan 418 and the modified, or pending, flight plan 420, as shown in FIG. 7. Additionally, the textual display 404 provides a simultaneous, textual representation of both flight plans. Looking at the far left column of the textual display 404, it can be seen that the modified flight plan consists of INW direct KLAS and then as filed. The waypoints proposed to be removed from the flight plan (GCN, PGS, and BLD) are shown vertically on the waypoint list between INW and KLAS, as originally included on the original plan. Because those waypoints are not on the modified flight plan, they are designated to be removed. In this embodiment, those waypoints are displayed "grayed out" and with a "\" placed over their identifiers, and the data associated with those waypoints is removed.

The textual display 404 in FIG. 7 is displaying the fuel predictions (fuel for each leg and the fuel remaining) of both the original and modified flight plans for each common waypoint that is on both flight plans. The original flight plan fuel predictions (leg and remaining) for each waypoint are displayed on the top half of the box, and the modified flight plan fuel predictions are displayed under the original flight plan fuel predictions. For example, the fuel remaining at KLAS for the original flight plan is 21,289 pounds, and the fuel remaining at KLAS for the modified flight plan is 21,481 pounds. In this embodiment, the modified flight plan fuel predictions are displayed using the same color as the modified flight plan 420.

The present invention is not limited to a comparison of fuel predictions between the original and modified flight plans. Rather, it encompasses any simultaneous, textual display of original and modified flight plans, ranging from only a comparison list of waypoint identifiers to a comparison of all constraints and performance parameters. For example, simultaneous presentation of both routes can allow comparison of ETAs, speed, distance, time, etc. Additionally, the present invention provides performance data for waypoints that are added to the modified flight plan.

Figure 8:
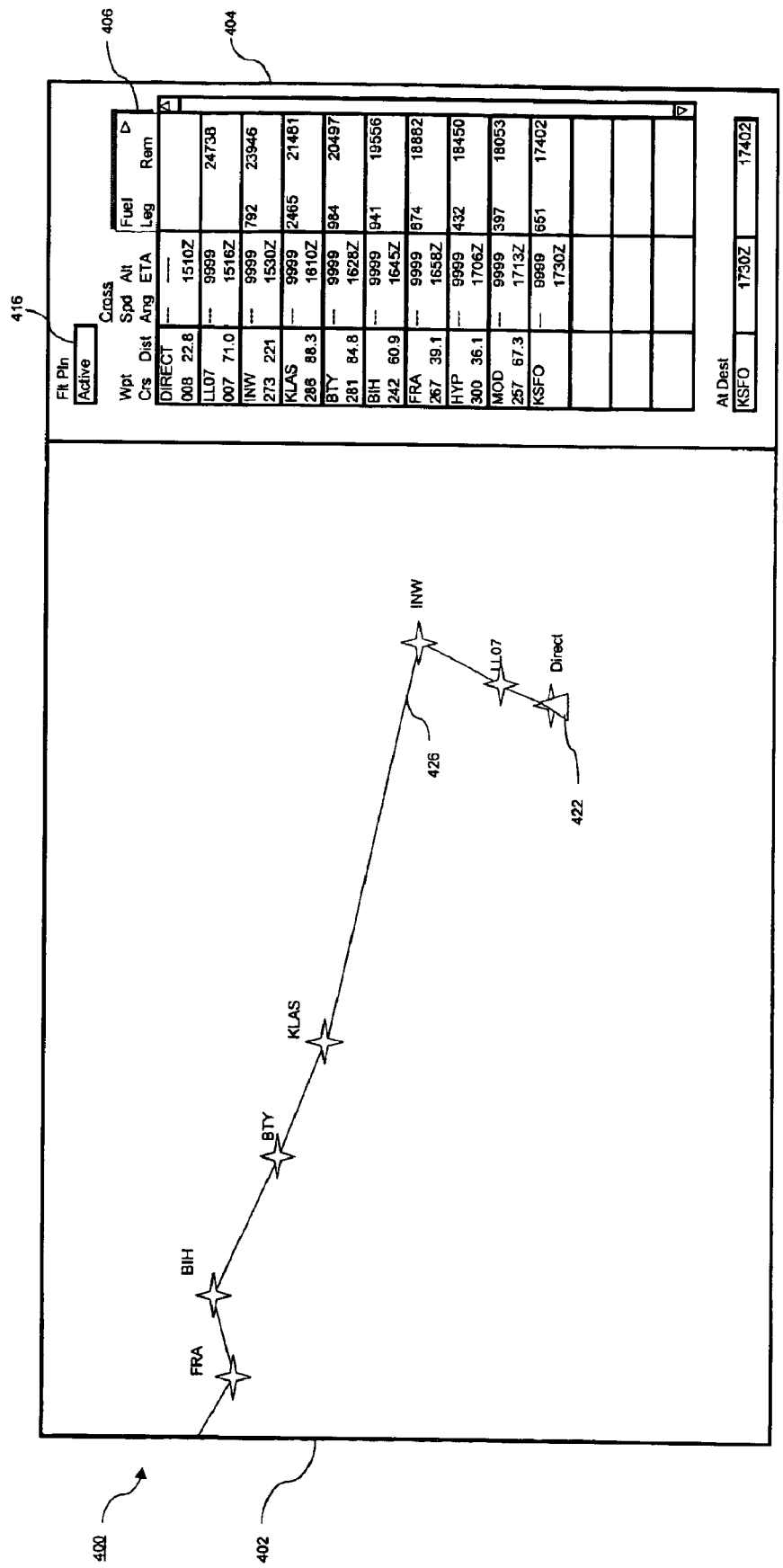
FIG. 8 is a combined graphical and textual display according to an embodiment of the present invention, showing the new flight plan.

Upon selecting Activate with the cursor 414 from the Activate/Cancel button 410 in either the graphical display 402 or the textual display 404, the modified flight plan becomes the new flight plan 426, as shown in FIG. 8. The waypoints that are not on the new flight plan are removed from the graphical display 402 and the textual display 404, leaving only the waypoints that remain on the new flight plan. The route type controller 416 indicates that an active flight plan is displayed, and the solid line 426 represents the new flight plan.

The simultaneous display of the waypoints on both the original and modified flight plans, as well as the constraints and performance parameters for both, allows the operator to compare the data from each route and make an informed decision before activating the modified flight plan.

The textual display may also have the feature of an option to list only the waypoints on the modified flight plan, i.e., without listing the waypoints marked for removal. The constraints and performance data for both flight plans are still simultaneously displayed, and the waypoints marked for removal are not removed from the original flight plan until the modified flight plan is activated.

The present invention is not limited to operation of the route type controller 416 as described above. For example, FIGS. 6 and 7 indicate "Pending" in the route type controller 416. However, a preferred method is for the route type controller 416 to indicate "Active" during the modification process, because the active and pending flight plans are displayed simultaneously. The route type controller can be used to display different types of flight plans on the navigational display 400 (e.g., a secondary flight plan) and is not limited to showing only the active flight plan.

The present invention is not limited to amending an original flight plan as discussed above. Rather, it encompasses any changes to the original flight plan where the original flight plan and the modified flight plan are simultaneously, textually displayed.

The logic required to create a textlist of waypoints that allows simultaneously comparing two flight plans will now be described with reference to FIGS. 9, 10, and 11.

As previously discussed, the two flight plans are the original flight plan and the modified flight plan. The modified flight plan is a copy of the original flight plan that is being edited. In a first method, any operations performed on the modified flight plan are also requested in the waypoint textlist of the textual display. As the modified flight plan is edited to diverge from the original flight plan, waypoints that are to be removed from the original flight plan are retained on the textlist, but they are shown in a non-original manner, e.g., grayed out. For waypoints that are common between the two flight plans, and for added waypoints, the constraints and performance parameters are displayed next to each other for comparison.

Options for editing a flight plan include, but are not limited to, skipping waypoints, inserting a single waypoint, inserting a series of waypoints, such as stored flight plans, procedures, and airways, etc., or a combination of the above. When adding a new waypoint, for example, the flight plan is searched forward from the point of insertion. If a duplicate of the new waypoint is found, then all the waypoints from just past the new waypoint up to and including the duplicate waypoint will be marked as "removed." The logic for applying this method of "folding forward" the textlist is shown in FIG. 9. This logic assures that only the newly added waypoints and waypoints from the original flight plan are presented in the textlist.

Figure 9:
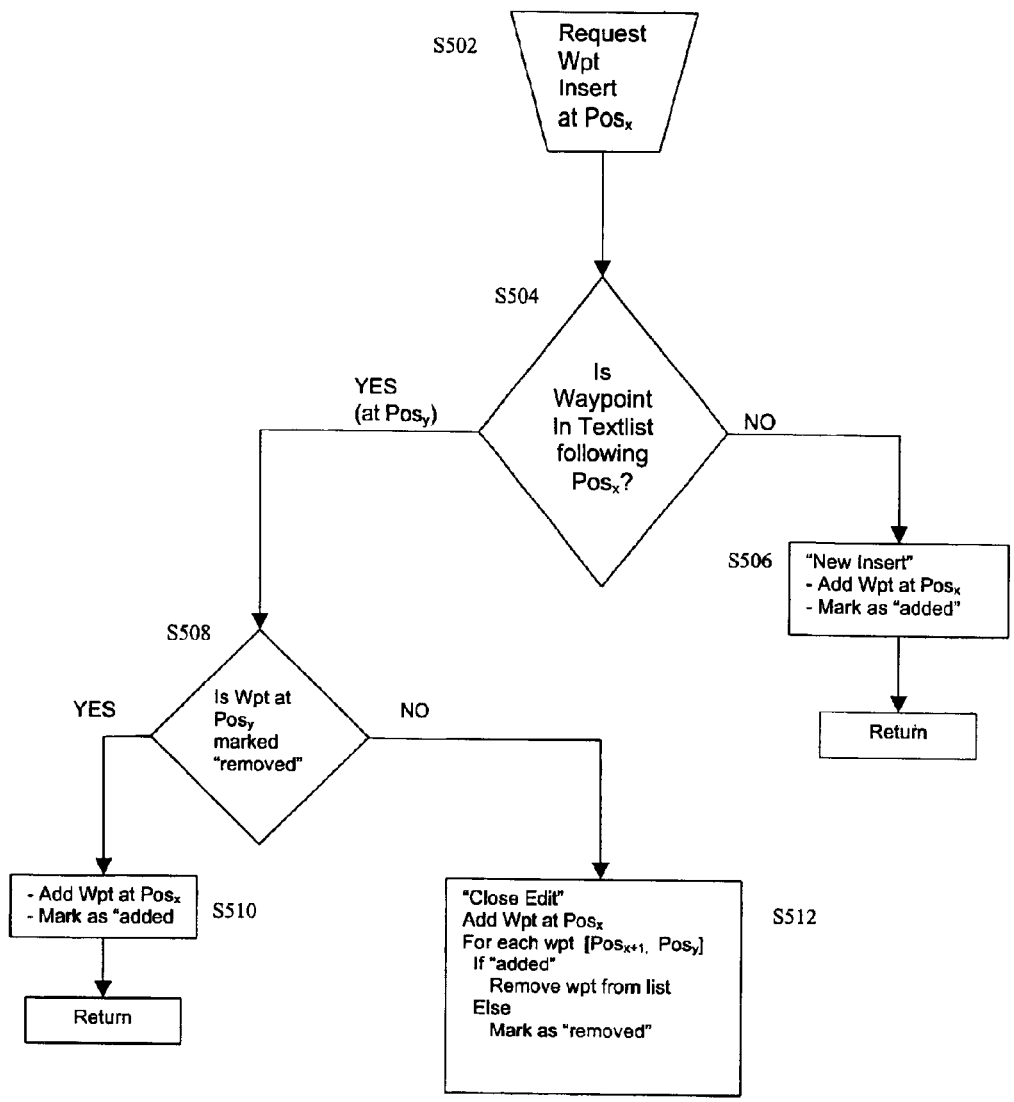
FIG. 9 is flowchart showing logic for simultaneously displaying the original and modified flight plans according to an embodiment of the present invention.

In Step S502 of FIG. 9, the user requests inserting a waypoint at Position X ($Pos_x$) in the flight plan through either inputs to the graphical display or the textual display. In Step S504, it is determined if the new waypoint is a duplicate of an existing waypoint in the textlist after $Pos_x$. If it is not a duplicate, then the new waypoint is inserted in the textlist and is marked as "added," Step S506, and the process returns to Step S502, where another waypoint may be added. If the new waypoint is a duplicate of another waypoint following $Pos_x$, for example, at $Pos_y$, then in Step S508, it is determined if the duplicate waypoint at $Pos_y$ is marked as removed. It would be marked as removed if, for example, it was identified to be removed prior to adding the new waypoint. If the duplicate waypoint at $Pos_y$ is marked as removed, then the new waypoint is added to the textlist in Step S510, it is marked as "added," and the process then returns to Step S502, where another waypoint may be added. If the duplicate waypoint at $Pos_y$ is not marked as removed, then the process proceeds to Step S512, where the new waypoint is added at $Pos_x$ and each waypoint after $Pos_x$ up to $Pos_y$ (i.e., $Pos_{x+1}$ to $Pos_y$) is either removed or marked as "removed." The waypoint is removed from the textlist if it was already marked as "added," for example, from Step S506 or Step S510. Otherwise, the waypoint is marked as "removed." The textlist of the modified flight plan then includes all waypoints from the original flight plan and all added waypoints, with waypoints to be removed from the original flight plan designated accordingly. For waypoints on the modified flight plan that are common with the original flight plan, a simultaneous display of the constraints and performance parameters of the common waypoint on each flight plan is then provided.

When an edit is closed by selecting a duplicate waypoint that is at a later position in the flight plan, that waypoint is inserted so that it shows up twice in the list, which preserves the constraints and performance parameters at both the beginning and the end of the section to be removed. However, on the textual display, the duplicate waypoint is preferably only listed once.

In Step S512, the logic may alternatively not insert the waypoint at $Pos_x$ and may then process waypoints from $Pos_x$ up to $Pos_{y-1}$. If the waypoint is marked as added, then it is removed from the list. Otherwise, it is marked as "removed," so that waypoints from $Pos_x$ to $Pos_{y-1}$ are designated as "removed."

An example of adding waypoints to an original flight plan will now be described, with new waypoints shown as underlined:

The original flight plan includes waypoints A B C D E F.

A modification is initiated at waypoint B.

Waypoint G is added after waypoint B, Step S502. Waypoint G is not a duplicate, Step S504, so it is added to the modified flight plan, Step S506.

The textlist now looks like: A B G C D E F.

Waypoint H is added, Step S502. Waypoint H is not a duplicate, Step S504, so it is added to the modified flight plan, Step S506.

The textlist now looks like: A B G H C D E F

The modification is closed at waypoint E, by designating waypoint E as the next waypoint after waypoint H (i.e., the modified flight plan returns to the original flight plan by adding waypoint E). Waypoint E is a duplicate, Step S504, and is not marked as "removed," Step S508; therefore, waypoint E is added to the modified flight plan, and waypoints at $Pos_{x+1}$ to $Pos_y$ are marked to be removed, Step S512.

The textlist now looks like: A B G H E F. (Or, alternatively, the textlist looks like: A B G H E F)

The textlist includes the waypoints shown above and allows comparison of the performance data for the modified and original flight plans. Performance data for added waypoints is also provided. Once the modified flight plan is activated to become the new flight plan, waypoints C, D, and original E (if first alternative) are removed, and the textlist then includes waypoints A B G H E F.

Another example of the logic will be discussed with reference to FIGS. 4 to 9. In FIG. 4, the original flight plan is shown and includes waypoints LL07, INW, GCN, PGS, BLD, KLAS, BTY, BIH, FRA, and then as filed. In FIG. 5, the user initiates a modification to the original flight plan by selecting INW with the cursor 414 and then selecting "amend route" from the menu 424. In FIG. 6, the user moves the cursor 414 to add KLAS as the next waypoint on the modified flight plan after INW, i.e., at $Pos_x$. This action corresponds to Step S502 in FIG. 9. KLAS is a duplicate of a waypoint at $Pos_y$ on the original flight plan, Step S504, and the waypoint at $Pos_y$ is not marked "removed," Step S508.

Using the alternative procedure for Step S512 described above, when the edit process is closed, the waypoints from $Pos_x$ to $Pos_{y-1}$, are marked as "removed." The textlist of the logic now includes INW, KLAS, BTY, BIH, FRA, and then as filed. As shown in FIG. 7, the textual display 404 shows the waypoints listed above, with waypoints GCN, PGS, and BLD designated to be removed. Textual display 404 also provides a comparison of the modified and original flight plans by displaying the constraints and performance parameters for common and added waypoints. Additionally, the graphical display 402 displays both the original flight plan 418 and the modified flight plan 420. When the modified flight plan is activated to become the new flight plan 426, waypoints GCN, PGS, and BLD are removed from the textual display 404 and the graphical display 402 (FIG. 8).

Logic of "folding back" may also be used for adding a series of waypoints. The "folding back" logic is shown in FIG. 10 and operates substantially the same as the logic of FIG. 9, with like steps being designated by the same reference number. A detailed discussion of the like steps is omitted. The difference in the "folding back" logic is that it looks back up the flight plan to find a duplicate of the first waypoint in a series of newly inserted waypoints (e.g. an arrival), Step S604. If a duplicate is found, for example, at $Pos_y$, then the waypoints will be marked as "removed" from $Pos_y$ to $Pos_{x-1}$, Step S612.

Figure 10:
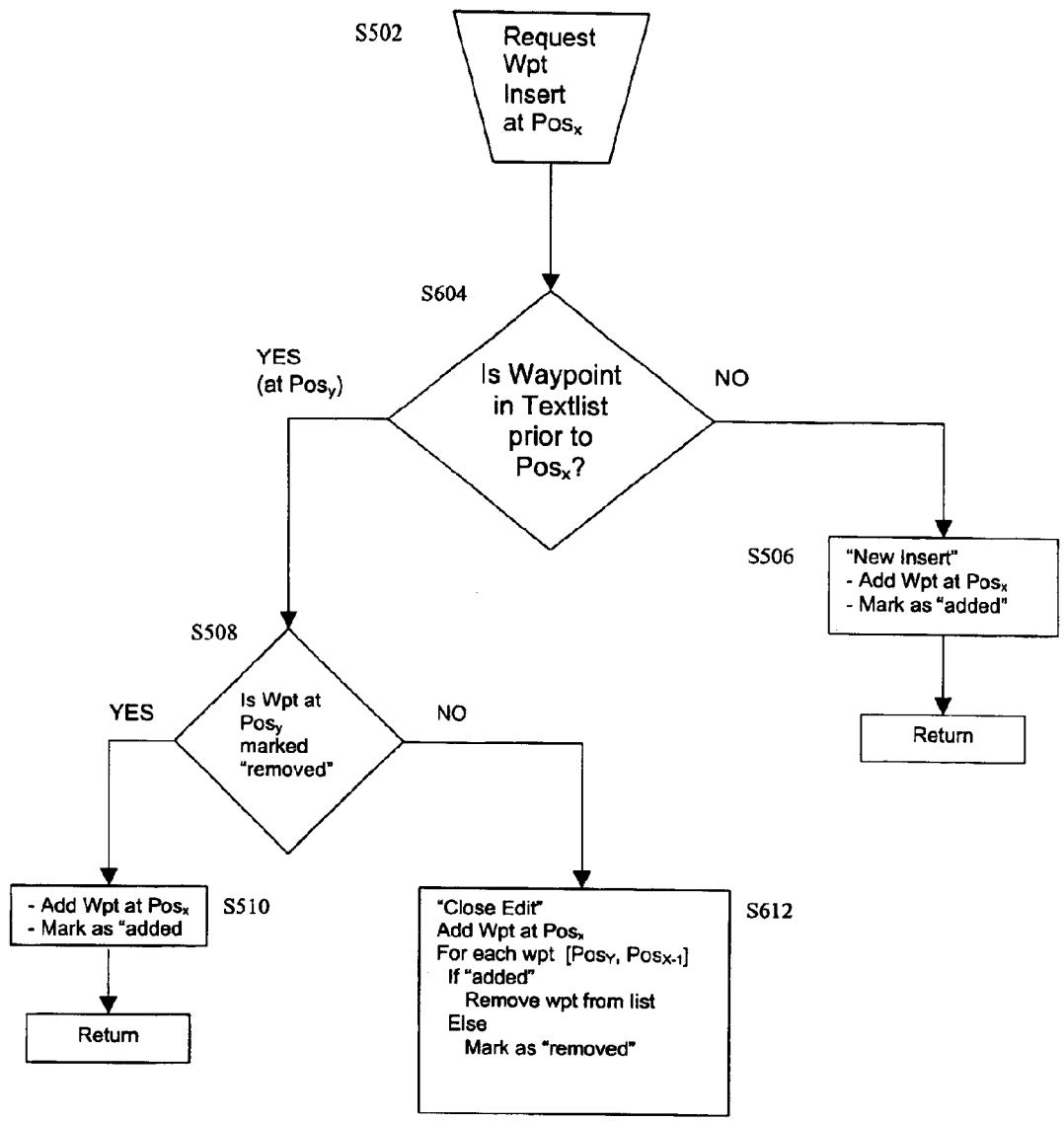
FIG. 10 is a flowchart showing logic for simultaneously displaying the original and modified flight plans according to another embodiment of the present invention.

The logic of FIGS. 9 and 10 is also used in other flight plan operations when inserting a procedure in a single operation of Step S502, for example, when adding a terminal procedure. The flight plan will be searched forward from the last waypoint or backwards from the first waypoint that is entered in the series.

A procedure is a series of waypoints that can be handled as a group. Whenever a procedure is selected in the modified flight plan, the old modified waypoints for the selected procedure will be removed and the new ones will be added. If the waypoints were part of the original flight plan procedure, they will be retained and marked as "removed." If there are "removed" waypoints already representing the new procedure, then the "removed" designation will be cleared.

When representing a procedure that is marked as "removed," it can be represented in the textlist by its name, e.g., or as the series of waypoints that make up the procedure section.

An example of using the folding back logic to add a series of waypoints to an original flight plan will now be described, with new waypoints shown as underlined:

The original flight plan includes waypoints A B C D E F.

A modification is initiated to add an approach following waypoint F. The approach includes waypoints C G H.

The approach C G H is added after the last waypoint F, Step S502. An interim textlist of the logic includes waypoints A B C D E F C G H. The first waypoint in the approach (C) is a duplicate of a previous waypoint at $Pos_y$, Step S604, that is not marked as "removed," Step S508. The waypoints from $Pos_y$ to $Pos_{x-1}$ are marked as "removed," Step S612.

The textlist of the logic now looks like: A B C G H.

The textlist includes the waypoints shown above and allows comparison of the performance data for the modified and original flight plans. Once the modified flight plan is activated to become the new flight plan, waypoints C, D, E, and F are removed, and the textlist then includes waypoints A B C G H.

The Logic of FIGS. 9 and 10 can also be adapted for a modified flight plan that only removes waypoints. For example, if the original flight plan includes waypoints A B C D and waypoint C is selected to be removed, then, as in Step S512, waypoint C would be marked as removed. The modified textlist would then show waypoints A B D and would allow comparison of the original flight plan and modified flight plan constraints and performance data. The same operation would apply if several waypoints were being removed, for example, if it is desired to bypass several waypoints by flying direct to a waypoint in the flight plan.

The preferred method for producing the textlist is to merge two flight plans, such as the original and modified flight plans, to form the textlist. Any waypoints in the original flight plan that are not in the modified flight plan will be marked "removed" in the textlist, and any waypoints that are new in the modified flight plan and not in the original flight plan will be marked as "added." In the preferred method, the textlist is rebuilt after each edit operation such as a waypoint or procedure insertion. The logic produces a textlist that shows waypoints that have been "added" in the modified flight plan, as well as waypoints that are "removed" from the original flight plan. The constraints and performance data for the two flight plans can then be simultaneously displayed and compared.

When a flight plan change is initiated on the original flight plan, the original flight plan is copied into the modified flight plan. Each modified waypoint is assigned a new ID and a CopyID. A CopyID is a copy of the original flight plan's waypoint ID from which the modified waypoint was copied. The use of a CopyID allows identification of the location of the waypoint in the original flight plan, even if the waypoint occurs more than once in the flight plan. By mapping one flight plan into the other in this way, the textlist can be correctly built because it can be determined exactly which waypoints are "removed" from the original flight plan and which have been "added" to the modified flight plan.

Figure 11:
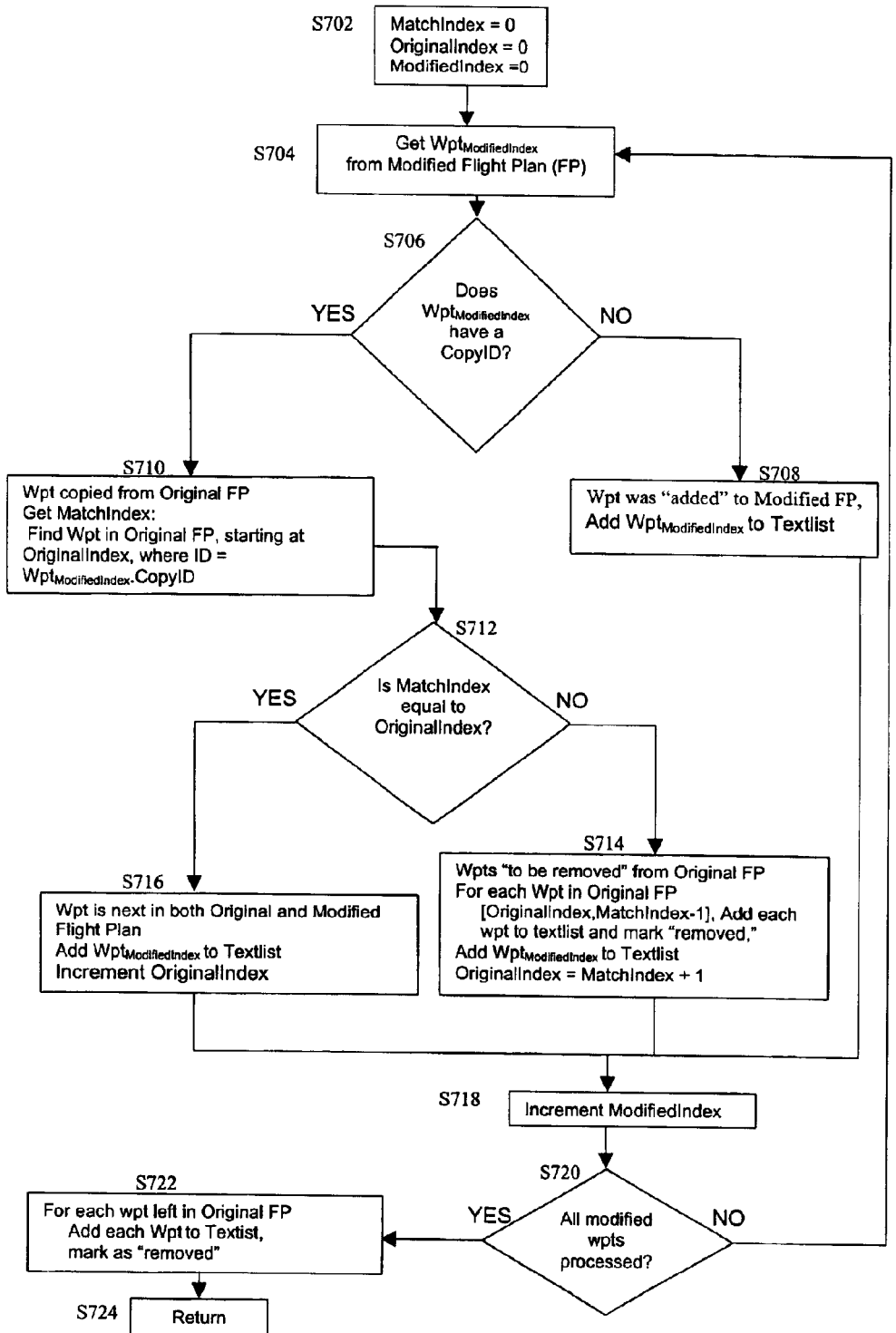
FIG. 11 is a flowchart showing logic for simultaneously displaying the original and modified flight plans according to yet another embodiment of the present invention.

FIG. 11 shows the logic for merging the original and modified flight plans into a textlist. An "index" is the position of a waypoint in a flight plan. The OriginalIndex and the ModifiedIndex correspond to the position where a waypoint action is currently being processed in the original and modified flight plans, respectively. The $Wpt_{ModifiedIndex}$ is the waypoint in the modified flight plan located at the modified index. The MatchIndex is the location in the original flight plan where the $Wpt_{ModifiedIndex}$ is found by searching forward from the OriginalIndex. At the MatchIndex, the CopyID of the $Wpt_{ModifiedIndex}$ in the modified flight plan equals the ID of the $Wpt_{MatchIndex}$ in the original flight plan.

Initially, in Step S702, the MatchIndex, OriginalIndex, and ModifiedIndex equal zero. In Step S704, the $Wpt_{ModifiedIndex}$, i.e., the waypoint located at the position ModifiedIndex, is obtained from the modified flight plan. In Step S706, it is determined if the $Wpt_{ModifiedIndex}$ has a valid CopyID, i.e., whether it was copied from the original flight plan. If it does not have a valid CopyID, then it has been "added" to the modified flight plan, and it is added directly to the textlist, Step S708. If there is a CopyID, then the process proceeds to Step S710, where the original flight plan is searched to find the location of the matching waypoint. The search of the original flight plan begins at the $Wpt_{OriginalIndex}$ and searches forward until the location of the matching waypoint is found (i.e., the MatchIndex is found).

The process then proceeds to Step S712, where it is determined if the MatchIndex equals the OriginalIndex (i.e., whether the location of the matching waypoint is in the same relative location in both the original and modified flight plans). If yes, then the waypoint is added to the textlist, and the OriginalIndex is incremented by one, Step S716. The process then proceeds to Step S 718, where the ModifiedIndex is incremented by one. If the answer in Step S712 is no, then there are waypoints in the original flight plan from the OriginalIndex down to the matching waypoint. These waypoints are added to the textlist and marked as "removed," Step S714. Also in Step S714, the matching waypoint ($Wpt_{ModifiedIndex}$) is added to the textlist, and the OriginalIndex is set to equal the ModifiedIndex plus one. The process then proceeds to Step S718, where the ModifiedIndex is incremented by one.

In Step S720, it is determined whether there are any waypoints left in the modified flight plan to process. If so, then the process returns to Step S704 to analyze the next waypoint in the modified flight plan. If not, then the process proceeds to Step S722, where all remaining waypoints in the original flight plan are added to the textlist and are marked as "removed." In Step S724, the process returns to Step S702 to wait the beginning of a new merge process.

In the process described above, each waypoint in the modified flight plan is compared to the original flight plan. After each comparison, the textlist is rebuilt to show the common waypoints on both flight plans, waypoints on the original flight plan that are designated to be removed, and additional waypoints that are only on the modified flight plan. Comparison data can then be provided for the common waypoints, and data for the added waypoints can also be provided.

This logic applies both to simple waypoint editing as well as to procedure waypoints inserted as a series. Procedure section names can be compared to determine if procedure sections have been changed. This can be used to display a removed procedure as a section name, e.g., rather than as a series of "removed" waypoints.

An example of the logic of FIG. 11 will now be described with reference to FIG. 12. As shown in FIG. 12, an original flight plan includes waypoints LL07, INW, GCN, PGS, BLD, KLAS, BTY, BIH, FRA, HYP, MOD, and KSFO. When an edit is initiated, each waypoint is copied into the modified flight plan and is assigned a CopyID corresponding to its original flight plan counterpart (FIG. 12 indicates which waypoints from the modified flight plan have a CopyID). The modified flight plan shown in FIG. 12 includes waypoints LL07, NW, KLAS, ABC, BTY, BIH, FRA, and HYP. FIG. 12 also shows the position of the waypoints in the original and modified flight plans, which correspond to the OriginalIndex position and ModifiedIndex position, respectively. After each edit to the modified flight plan, the logic of FIG. 11 is used to rebuild the textlist.

This example will describe rebuilding the textlist from the complete modified flight plan shown in FIG. 12. To rebuild the textlist from the flight plans shown in FIG. 12, the following steps are performed. In Step S702, the process starts at index position 0 in the original and modified flight plans. In Step S704, the first waypoint LL07 at position ModifiedIndex 0 is obtained from the modified flight plan. In Step S706, it is determined that LL07 has a CopyID, indicating that it originated from the original flight plan (i.e., LL07 has a matching waypoint in the original flight plan). The process proceeds to Step S710 to obtain the MatchIndex, which corresponds to the position of the matching waypoint in the original flight plan. The MatchIndex for LL07 in the original flight plan is 0, because LL07 is located at index position 0. The OriginalIndex for LL07 is also 0, as mentioned earlier.

In Step S712, it is determined that the MatchIndex equals the OriginalIndex, and the process proceeds to Step S716, where waypoint LL07 is added to the textlist, and the OriginalIndex is incremented to position 1. In Step S718, the ModifiedIndex is incremented to position 1. In Step S720, it is determined that all waypoints in the modified flight plan have not been processed, and the process returns to Step S704.

In Step S704, the next waypoint in the modified flight plan is obtained, i.e., the waypoint INW at ModifiedIndex 1 is obtained. The process for INW is identical to that of LL07, and a detailed discussion is omitted.

After the OriginalIndex and ModifiedIndex have been incremented to position 2, the process again returns to Step S704, where KLAS is obtained from the modified flight plan. In Step S706, it is determined that KLAS has a CopyID, indicating that it originated from the original flight plan (i.e., KLAS has a matching waypoint in the original flight plan). The process proceeds to Step S710 to obtain the MatchIndex, which corresponds to the position of the matching waypoint in the original flight plan. The MatchIndex for KLAS in the original flight plan is 5, because KLAS is located at index position 5. However, the OriginalIndex is set to 2.

In Step S712, it is determined that the MatchIndex and the OriginalIndex are not equal, and the process proceeds to Step S714. In Step S714, waypoints from the OriginalIndex to the MatchIndex−1 (i.e., GCN, PGS, and BLD) are added to the textlist and marked as "removed." KLAS is also added to the textlist, and the OriginalIndex is set to the MatchIndex+1 (i.e., 6). In Step S718, the ModifiedIndex is incremented to position 3. In Step S720, it is determined that all waypoints in the modified flight plan have not been processed, and the process returns to Step S704.

In Step S704, ABC is obtained from position 3 of the modified flight plan. In Step S706, it is determined that ABC does not have a CopyID, i.e., it did not originate from the original flight plan. The process proceeds to Step S708 where ABC is added to the textlist. The ModifiedIndex is incremented to 4, Step S718, and the process returns to Step S704 after it is determined in Step S720 that all modified waypoints have not been processed.

At this point, the OriginalIndex is 6 and the ModifiedIndex is 4. Waypoints BTY, BIH, FRA, and HYP are processed and added to the textlist in a similar manner as waypoints LL07 and INW, and a description of their processing is omitted.

After HYP is processed, it is determined in Step S720 that all waypoints in the modified flight plan have been processed. The process then proceeds to Step S722 where the waypoints remaining in the original flight plan (i.e., MOD and KSFO) are added to the textlist and marked as "removed." In Step S724, the process returns to Step S702 for the next editing procedure.

It is preferable to use the present invention with computer hardware and software that performs the processing and implementing functions. As will be s appreciated by those skilled in the art, the systems, methods, and procedures described herein can be embodied in a programmable computer, computer executable software, or digital circuitry. The software can be stored on computer readable media, for example, on a floppy disk, RAM, ROM, a hard disk, removable media, flash memory, memory sticks, optical media, magneto-optical media, CD-ROMs, etc. The digital circuitry can include integrated circuits, gate arrays, building block logic, field programmable gate arrays (FPGA), etc.

Although specific embodiments of the present invention have been described above in detail, it will be understood that this description is merely for purposes of illustration. Various modifications of, and equivalent steps corresponding to, the disclosed aspects of the preferred embodiments, in addition to those described above, may be made by those skilled in the art without departing from the spirit of the present invention defined in the following claims, the scope of which is to be accorded the broadest interpretation so as to encompass such modifications and equivalent structures.

We claim:

1. A navigational system, comprising:
    a display device that includes a graphical display portion and a textual display portion; and
    logic for operating the graphical display portion and the textual display portion of said display device, said logic presenting a textual display of an original flight plan and a modified flight plan in the textual display portion while simultaneously presenting a graphical display of the original flight plan in the graphical display portion.

2. A navigational system according to claim 1, wherein the textual display presented by said logic comprises a text list of waypoints that are on the original flight plan and the modified flight plan, and performance data for common waypoints that are on both the original flight plan and the modified flight plan.

3. A navigational system according to claim 2, wherein the textual display presented by said logic further comprises performance data for waypoints that are added to the modified flight plan.

4. A navigational system according to claim 2, wherein the performance data for each common waypoint comprises performance data for the waypoint on the original flight plan and for the waypoint on the modified flight plan.

5. A navigational system according to claim 4, further comprising:
    an interface device that allows an operator to change the modified flight plan, wherein said logic updates the textlist of waypoints on the textual display when the modified flight plan is changed, and
    wherein said logic updates the performance data on the textual display for common waypoints when the modified flight plan is changed.

6. A navigational system according to claim 5, wherein said logic designates on the textual display waypoints to be removed, which correspond to waypoints that are on the original flight plan but not on the modified flight plan.

7. A navigational system according to claim 6, wherein, when the modified flight plan is activated to become a new original flight plan, said logic removes from the textual display the waypoints that are designated to be removed.

8. A navigational system according to claim 7, wherein a graphical display of the original flight plan and the modified flight plan is simultaneously presented on said display device together with the simultaneous textual display of the original flight and the modified flight plan,
    wherein said interface device allows an operator to change the modified flight plan on either the textual display or the graphical display,
    wherein the graphical display of the modified flight plan is updated when the modified flight plan is changed, and
    wherein, when the modified flight plan is activated to become the new flight plan, the graphical display is updated to display only the new original flight plan.

9. A navigational system according to claim 5, wherein a graphical display of the original flight plan and the modified flight plan is simultaneously presented on said display device together with the simultaneous textual display of the original flight and the modified flight plan, wherein said interface device allows an operator to change the modified flight plan on either the textual display or the graphical display, and wherein the graphical display of the modified flight plan is updated when the modified flight plan is changed.

10. A navigational system according to claim 1, wherein a graphical display of the original flight plan and the modified flight plan is simultaneously presented on said display device together with the simultaneous textual display of the original flight and the modified flight plan.

11. A navigational system according to claim 1, wherein said logic produces a textlist by merging the original flight plan and the modified flight plan, with the textlist displaying waypoints that have been added in the modified flight plan and waypoints that are removed from the original flight plan, and the textlist being displayed on the textual display portion of said display device.

12. A navigational system according to claim 1, wherein the modified flight plan is a pilot-created flight plan achieved by changing waypoints on the original flight plan.

13. A navigational system according to claim 1, further comprising logic that simultaneously presents a textual display of an original flight plan and a modified flight plan in the textual portion while graphically displaying the original flight plan and the modified flight plan.

14. A navigational system, comprising;

display means that includes a graphical display portion and a textual display portion; and logic means for operating the graphical display portion and the textual display portion of said display device, with said logic means textually displaying an original flight plan and a modified flight plan in the textual display portion while simultaneously presenting a graphical display of the original flight plan in the graphical display portion.

15. A navigational system according to claim 14, wherein the textual display presented by said logic means comprises a textlist of waypoints that are on the original flight plan and the modified flight plan, and performance data for common waypoints that are on both the original flight plan and the modified flight plan.

16. A navigational system according to claim 15, wherein the textual display presented by said logic means further comprises performance data for waypoints that are added to the modified flight plan.

17. A navigational system according to claim 15, wherein the performance data for each common waypoint comprises performance data for the waypoint on the original flight plan and for the waypoint on the modified flight plan.

18. A navigational system according to claim 17, further comprising:

interface means that allows an operator to change the modified flight plan, wherein said logic means updates the textlist of waypoints on the textual display when the modified flight plan is changed, and wherein said logic means updates the performance data on the textual display for common waypoints when the modified flight plan is changed.

19. A navigational system according to claim 18, wherein said logic means designates on the textual display waypoints to be removed, which correspond to waypoints that are on the original flight plan but not on the modified flight plan.

20. A navigational system according to claim 19, wherein, when the modified flight plan is activated to become a new flight plan, said logic means removes from the textual display the waypoints that are designated to be removed.

21. A method of displaying a flight plan of a navigational system, comprising the steps of:

providing a display device that includes a graphical display portion and a textual display portion; and displaying a textual display of an original flight plan and a modified flight plan in the textual display portion while simultaneously displaying a graphical display of the original flight plan in the graphical display portion.

22. A method according to claim 21, wherein the textual display displayed in said displaying step comprises a textlist of waypoints that are on the original flight plan and the modified flight plan, and performance data for common waypoints that are on both the original flight plan and the modified flight plan.

23. A method according to claim 22, wherein the textual display displayed in said displaying step further comprises performance data for waypoints that are added to the modified flight plan.

24. A method according to claim 22, wherein the performance data for each common waypoint comprises performance data for the waypoint on the original flight plan and for the waypoint on the modified flight plan.

25. A method according to claim 24, further comprising the steps of:

changing the modified flight plan;

updating the textlist of waypoints on the textual display when the modified flight plan is changed; and updating the performance data on the textual display for common waypoints when the modified flight plan is changed.

26. A method according to claim 25, further comprising the step of:

designating the textual display waypoints to be removed, which correspond to waypoints that are on the original flight plan but not on the modified flight plan.

27. A method according to claim 26, further comprising the steps of:

activating the modified flight plan to become a new flight plan; and removing from the textual display the waypoints that are designated to be removed in said designating step.

28. A method according to claim 27, wherein said displaying step further comprises simultaneously displaying a graphical display of the original flight plan and the modified flight plan on the display device together with the simultaneous textual display of the original flight plan and the modified flight plan, wherein said changing step comprises changing the modified flight plan in either the graphical display or the textual display, and wherein said method further comprises the steps of:

updating the graphical display of the modified flight plan when the modified flight plan is changed; and updating the graphical display to display only the new flight plan when the modified flight plan is activated in said activating step.

29. A method according to claim 25, wherein said displaying step further comprises simultaneously displaying a graphical display of the original flight plan and the modified flight plan on the display device together with the simultaneous textual display of the original flight plan and the modified flight plan, wherein said changing step comprises changing the modified flight plan in either the graphical display or the textual display, and wherein said method further comprises the step of updating the graphical display of the modified flight plan when the modified flight plan is changed.

30. A method according to claim 21, wherein said displaying step further comprises simultaneously displaying a graphical display of the original flight plan and the modified flight plan on the display device together with the simultaneous textual display of the original flight plan and the modified flight plan.

31. Computer executable code for implementing a method of displaying a flight plan of a navigational system, said code for executing the step comprising: displaying a textual display of an original flight plan and a modified flight plan in the textual display portion while simultaneously displaying a graphical display of the original flight plan in the graphical display portion.

32. Computer executable code according to claim 31, wherein the textual display displayed in said displaying step comprises a textlist of waypoints that are on the original flight plan and the modified flight plan, and performance data for common waypoints that are on both the original flight plan and the modified flight plan.

33. Computer executable code according to claim 32, wherein the textual display displayed in said displaying step further comprises performance data for waypoints that are added to the modified flight plan.

34. Computer executable code according to claim 32, wherein the performance data presented for each common waypoint comprises performance data for the waypoint on the original flight plan and for the waypoint on the modified flight plan.

35. Computer executable code according to claim 34, said code for further executing the steps comprising:

changing the modified flight plan;

updating the textlist of waypoints on the textual display when the modified flight plan is changed; and updating the performance data on the textual display for common waypoints when the modified flight plan is changed.

36. Computer executable code according to claim 35, said code for further executing the step comprising:

designating on the textual display waypoints to be removed corresponding to waypoints that are on the original flight plan but not on the modified flight plan.

37. Computer executable code according to claim 36, said code for further executing the steps comprising:

activating the modified flight plan to become a new flight plan; and removing from the textual display the waypoints that are designated to be removed in said designating step.

38. Computer executable code according to claim 37, wherein said displaying step further comprises simultaneously displaying a graphical display of the original flight plan and the modified flight plan on the display device together with the simultaneous textual display of the original flight and the modified flight plan, wherein said changing step comprises changing the modified flight plan in either the graphical display or the textual display, and said code for further executing the steps comprising:

updating the graphical display of the modified flight plan when the modified flight plan is changed; and updating the graphical display to display only the new flight plan when the modified flight plan is activated in said activating step.

39. Computer executable code according to claim 35, wherein said displaying step further comprises simultaneously displaying a graphical display of the original flight plan and the modified flight plan on the display device together with the simultaneous textual display of the original flight and the modified flight plan, wherein said changing step comprises changing the modified flight plan in either the graphical display or the textual display, and said code for further executing the step of updating the graphical display of the modified flight plan when the modified flight plan is changed.

40. Computer executable code according to claim 31, wherein said displaying step further comprises simultaneously displaying a graphical display of the original flight plan and the modified flight plan on the display device together with the simultaneous textual display of the original flight and the modified flight plan.

41. A navigational system, comprising:

a CPU;

a flight control system that controls an airplane based on inputs from said CPU;

a display device; and logic for operating a graphical display portion and a textual display portion of said display device, said logic presenting a textual display of an original flight plan and a modified flight plan in the textual display portion while simultaneously presenting a graphical display of the original fight plan in the graphical display portion, wherein said CPU provides inputs to said flight control system based on navigational data corresponding to the original flight plan that is presented on said display device.

42. A navigational system according to claim 41, wherein a textual display presented by said logic comprises a text list of waypoints that are on the original flight plan and the modified flight plan, and performance data for common waypoints that are in both the original flight plan and the modified flight plan.

43. A navigational system, comprising:

a display device; and logic for operating a graphical display portion and a textual display portion of said display device, said logic presenting a textual display of comparative data for an original flight plan and a modified flight plan in the textual display portion while simultaneously presenting a graphical display of the original flight plan in the graphical display portion.

44. A navigational system according to claim 43, wherein the comparative data comprises a textlist of waypoints that are on the original flight plan and the modified flight plan, and performance data for common waypoints that are on both the original flight plan and the modified flight plan.

45. A navigational system according to claim 44, wherein the performance data for each common waypoint comprises performance data for the waypoint on the original flight plan and for the waypoint on the modified flight plan.

46. A navigational system according to claim 45, further comprising:

an interface device that allows an operator to change the modified flight plan, wherein said logic updates the comparative data on the textual display when the modified flight plan is changed.

47. A navigational system according to claim 46, wherein said logic designates the textual display waypoints to be removed, which correspond to waypoints that are on the original flight plan but not on the modified flight plan.

48. A navigational system according to claim 47, wherein, when the modified flight plan is activated to become a new flight plan, said logic removes from the textual display the waypoints that are designated to be removed.

49. A navigational system according to claim 48, wherein a graphical display of the original flight plan and the modified flight plan is simultaneously presented on said display device together with the simultaneous textual display of the original flight and the modified flight plan, wherein said interface device allows an operator to change the modified flight plan on either the textual display or the graphical display, wherein the graphical display of the modified flight plan is updated when the modified flight plan is changed, and wherein, when the modified flight plan is activated to become a new flight plan, the graphical display is updated to display only the new flight plan.

50. A navigational system according to claim 46, wherein a graphical display of the original flight plan and the modified flight plan is simultaneously presented on said display device together with the simultaneous textual display of the original flight and the modified flight plan, wherein said interface device allows an operator to change the modified flight plan on either the textual display or the graphical display, and wherein the graphical display of the modified flight plan is updated when the modified flight plan is changed.

51. A navigational system according to claim 43, wherein a graphical display of the original flight plan and the modified flight plan is simultaneously presented on said display device together with the simultaneous textual display of the original flight and the modified flight plan.

* * * * *